(12) United States Patent
Shaker et al.

(10) Patent No.: US 7,889,665 B2
(45) Date of Patent: Feb. 15, 2011

(54) BRIDGE PORT MAC ADDRESS DISCOVERY MECHANISM IN ETHERNET NETWORKS

(75) Inventors: Maged E. Shaker, Ottawa (CA); Michael Weedmark, Carp (CA); Alykhan Nathoo, Ottawa (CA)

(73) Assignee: Alcatel Lucent, Paris (FR)

( * ) Notice: Subject to any disclaimer, the term of this patent is extended or adjusted under 35 U.S.C. 154(b) by 185 days.

(21) Appl. No.: 12/071,983

(22) Filed: Feb. 28, 2008

(65) Prior Publication Data
US 2009/0219831 A1 Sep. 3, 2009

(51) Int. Cl.
*H04L 12/26* (2006.01)
(52) U.S. Cl. .............. 370/241.1; 370/252; 370/389; 709/228
(58) Field of Classification Search .............. None
See application file for complete search history.

(56) References Cited

U.S. PATENT DOCUMENTS

| | | | |
|---|---|---|---|
| 7,072,337 B1 * | 7/2006 | Arutyunov et al. | 370/389 |
| 2004/0095928 A1 * | 5/2004 | O'Neill et al. | 370/389 |
| 2007/0223493 A1 | 9/2007 | Sridhar et al. | |
| 2008/0016402 A1 * | 1/2008 | Harel et al. | 714/43 |
| 2008/0144514 A1 * | 6/2008 | Yan | 370/241.1 |

FOREIGN PATENT DOCUMENTS

| EP | 1528721 A3 | 5/2005 |
|---|---|---|
| EP | 1791294 A1 | 5/2007 |

\* cited by examiner

*Primary Examiner*—Seema S Rao
*Assistant Examiner*—K. Huynh
(74) *Attorney, Agent, or Firm*—Kramer & Amado, P.C.

(57) ABSTRACT

Various exemplary embodiments are a method and of discovering medium access control (MAC) addresses in a network and a related access node including one or more of the following: receiving, at an access node, a diagnostic message from an operator, the diagnostic message comprising physical port information and indicating that at least a portion of a MAC address of a destination bridge port is unknown to the operator; forwarding the diagnostic message to a respective bridge port of the access node; determining whether the physical port information specified in the diagnostic message corresponds to a physical port of the respective bridge port; and sending a reply message to the operator specifying a MAC address of the respective bridge port.

17 Claims, 3 Drawing Sheets

BRIDGE PORT MAC ADDRESS DISCOVERY MECHANISM IN ETHERNET NETWORKS

BACKGROUND OF THE INVENTION

1. Field of the Invention

This invention relates generally to detecting and diagnosing connectivity problems in computer networks.

2. Description of Related Art

Network providers are increasingly using Ethernet networks as a solution for their customers given Ethernet's abundant bandwidth, low cost, inherent support for multipoint operations, and numerous other advantages. Despite these advantages, however, native Ethernet lacks carrier-grade management capabilities. As a result, Ethernet network providers must frequently conduct expensive and time consuming diagnostics using on-site technicians. Furthermore, Ethernet networks often constitute a number of bridges operated by multiple network providers. Given limited management access to the equipment of the other network providers, a network provider encounters a number of difficulties in identifying, diagnosing, and solving network connectivity problems.

In order to address these problems, one mechanism, Connectivity Fault Management (CFM), provides tools to monitor and troubleshoot Ethernet networks. CFM is described in detail in the published standard, IEEE 802.1ag. In particular, the IEEE 802.1ag standard specifies protocols, procedures, and managed objects to support CFM. By utilizing these protocols, procedures, and objects, a network operator can discover and verify paths through bridges and LANs and detect and isolate connectivity failures.

The CFM standard defines two key elements, Maintenance Intermediate Points (MIP) and Maintenance Endpoints (MEP). MIPs and MEPs are entities created within network bridges solely for the purpose of fault management. Thus, MEPs initiate and respond to CFM messages, while MIPs passively receive these messages and respond to the originating MEP.

MIPs and MEPs support a number of messages used for fault management. For example, operators can use the CFM Loopback message (LBM) to identify the precise fault location along a particular logical connection. More specifically, the Loopback message pings a specific Medium Access Control (MAC) address of an MIP or MEP and waits for a response. Use of this type of message allows the network operator to isolate the faulty bridge, as the MIP or MEP at the faulty bridge will not respond to the Loopback message.

Operators can also use the Link Trace message (LTM) to determine the path to another MEP or MIP in the same domain. In particular, each intermediate MIP along the path responds with a Link Trace reply and forwards the Link Trace message to the next hop. This process continues until the Link Trace message reaches the destination MEP or MIP. Again, the operator must know the MAC address of the destination MEP or MIP in order to initiate the Link Trace message.

As evident from the above discussion, standard Loopback and Link Trace messages require the MAC address of the destination MEP or MIP. For reasons discussed in further detail herein, it is often difficult, or even impossible, for a network operator to determine the required MAC address. Accordingly, there is a need for a MAC address discovery mechanism that allows a network operator to determine a required MAC address based on physical port information known to the operator.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations, and improvements herein shown and described in various exemplary embodiments.

SUMMARY OF THE INVENTION

In order to use CFM efficiently, network operators must determine and maintain a listing of MAC addresses of each MEP and MIP located at physical bridge ports throughout the network. Network operators may be unable to determine the MAC address of a particular MEP or MIP for a number of reasons.

First, when hardware is upgraded or added to the network, additional MAC addresses are added and these addresses may not be known. In addition, network operators may have limited access to nodes in the network, such that it is impossible to determine the MAC address of the MEP or MIP at that node. Finally, in very large networks, there may simply be too many MAC addresses to determine and maintain.

Consider, for example, problems that arise in the context of access networks. In access networks that use Ethernet for customer traffic aggregation and back-hauling, an access node may have a large number of bridge ports connected to customer premise equipment (CPE). In a wholesale model in an access network, different service providers may manage certain segments of the network, such that retail ISP operators would have no management access to nodes in the carrier network.

Furthermore, access nodes may internally allocate and assign private MAC addresses to customer bridge ports, rather than utilizing public MAC addresses. Private MAC addresses are built such that the local bit is set in the address and the remaining bits are freely set by the access node. When private MAC addresses are used, an ISP operator using CFM to troubleshoot a connectivity issue is often unable to determine the destination MAC address. Consequently, the ISP operator is unable to utilize Loopback and Link Trace messages to troubleshoot the problem, as these messages require a destination MAC address.

For example, the Alcatel-Lucent 7330 ISAM builds the private MAC address of a bridge port based on the Digital Subscriber Line Access Multiplexer (DSLAM) Node ID, Rack ID, Slot ID, and Port ID. The Port ID is internally generated and cannot be determined without querying the ISAM. Again, if an ISP operator desires to query the 7330 ISAM using a Loopback or Link Trace message, the operator would need to know the private MAC address of the customer bridge port on the 7330 ISAM. While the operator would know the DSLAM ID, Rack ID, and Slot ID, the operator could not compose the entire MAC address, since the operator cannot discover the Port ID.

Based on the current CFM standard implementation, two possible methods could be used by operators to discover MAC addresses. A first method sends multicast Loopback messages towards the customer bridge ports for which MAC addresses need to be discovered. Because the Loopback message is sent via multicast, however, the message is forwarded to every node in the network (i.e. the virtual LAN). As a result, every bridge port with an MEP or MIP replies with a unicast Loopback Reply towards the originator.

Although relatively simple, this method suffers from a number of deficiencies. First, this method generates a large amount of unnecessary network traffic. For example, in a fully-populated Alcatel-Lucent 7330 ISAM using residential bridging, a single multicast Loopback message can translate into thousands of messages sent over the network, resulting in a significant impact on network performance. Moreover, because a message is returned from each bridge port, the operator could receive thousands of replies and would therefore be unable to correlate the received MAC addresses with the associated bridge ports.

A second method requires the operator to directly query the access node to determine the bridge port MAC addresses. The operator could then store information maintaining an association between bridge ports and MAC addresses. This method, however, would require a significant investment of time, as the network operator would be required to individually update each mapping. Furthermore, as described above, it would be difficult to keep this information current, as hardware is frequently upgraded or added to the network, resulting in additional MAC addresses. Moreover, some network operators, such as retail ISPs in a wholesale network, may not have management access to the specific nodes.

Accordingly, a simplified mechanism is needed to allow the operator to discover the public or private MAC address of a targeted bridge port using the existing standards in Ethernet public networks. Furthermore, a mechanism is needed to allow an operator to determine the MAC address when the operator is unaware of one or more fields required to formulate the MAC address.

In light of the present need for a bridge port MAC address discovery mechanism in Ethernet networks, a brief summary of various exemplary embodiments is presented. Some simplifications and omissions may be made in the following summary, which is intended to highlight and introduce some aspects of the various exemplary embodiments, but not to limit its scope. Detailed descriptions of preferred exemplary embodiments adequate to allow those of ordinary skill in the art to make and use the inventive concepts will follow in later sections.

In various exemplary embodiments, a method allows an operator to request the MAC address of a specific target physical bridge port using Loopback and Link Trace messages. Thus, in various exemplary embodiments, an operator adds the target physical bridge port into the LBM or the LTM that is sent towards the access node. The LBM or LTM is flooded throughout the network and encounters all possible Maintenance Endpoints and Maintenance Intermediate Points at the message level. In various exemplary embodiments, Loopback Replies and Link Trace Replies are transmitted only by the MEPs and MIPs with a physical location matching the location information specified in the message. Consequently, various exemplary embodiments significantly reduce the amount of traffic generated in the network for troubleshooting operations. In addition, the above-described approach of requesting MAC addresses in the wholesale model would not be required, as MAC addresses could be determined by the retail operator.

In addition, in various exemplary embodiments, the operator does not have to specify the full physical bridge port and instead provides only the parts that are known. Thus, in various exemplary embodiments, the operator adds the target physical port to the LBM or the LTM using different approaches. In various exemplary embodiments, the operator embeds the target physical bridge port using a wildcard private MAC address inside the destination address field of the LBM or the target MAC address field of the LTM. Alternatively, in various exemplary embodiments, the operator uses an organization-specific private MAC address to indicate that the target physical bridge port information is embedded inside the standard organization-specific type length value (TLV) in the LBM or LTM.

Accordingly, in various exemplary embodiments, when a Broadband Remote Access Server (BRAS) operator sends an LBM or LTM using a wildcard private MAC address or an organization-specific private MAC address, replies are only sent by MEPs and MIPs with a physical location matching the physical port information embedded in the wildcard private MAC address or in the organization-specific TLV. Furthermore, in various exemplary embodiments, the replying MEPs and MIPs set the source address in the reply message to the actual bridge port MAC addresses. In addition, in various exemplary embodiments, the Link Trace reply includes additional information about the bridge port in the organization-specific TLV, such as a physical representation. Accordingly, in various exemplary embodiments, upon receipt of the reply message, the BRAS operator can extract the bridge port MAC address and additional information.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
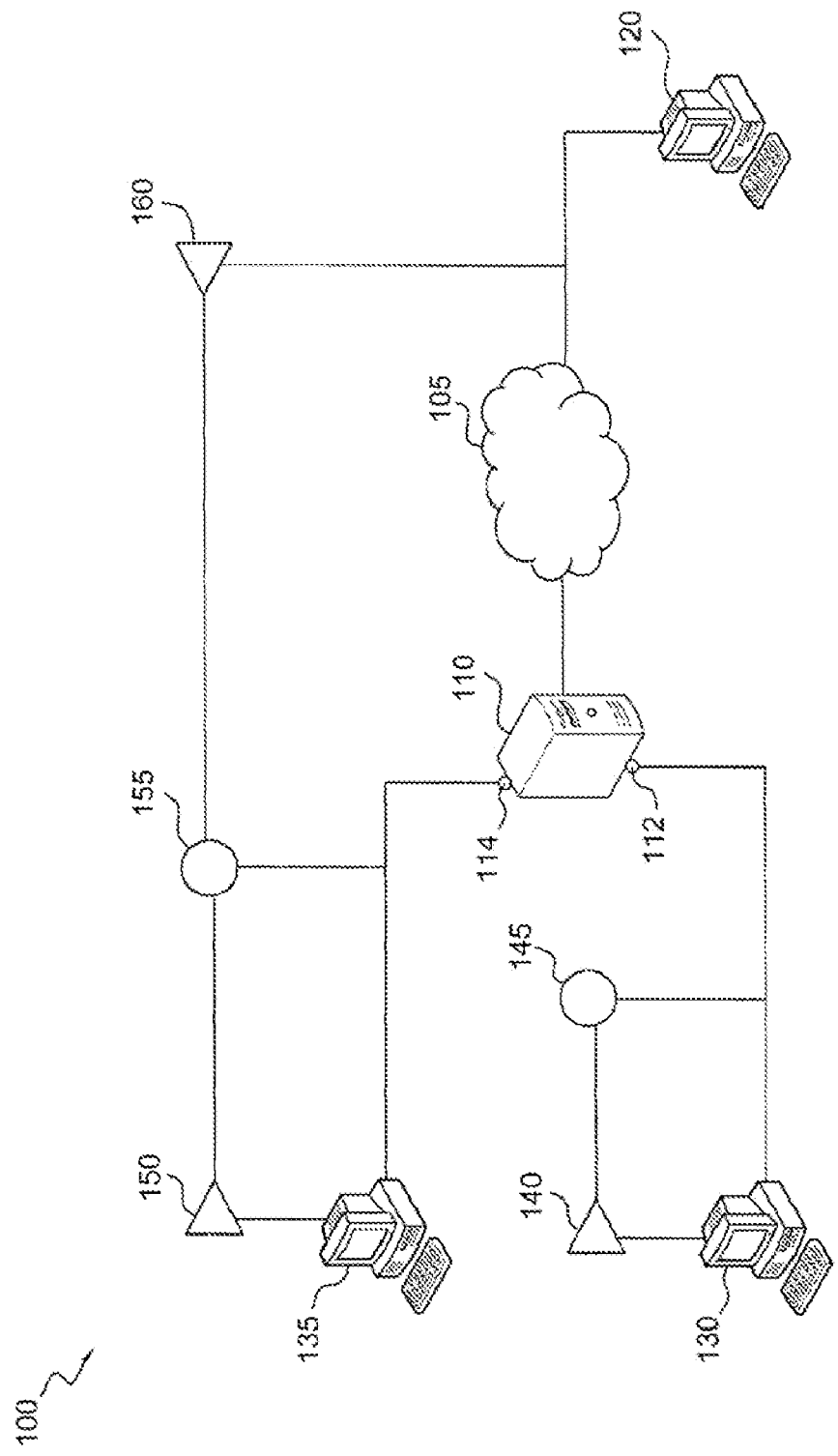
FIG. 1 is a schematic diagram of an exemplary Ethernet network implementing a bridge port MAC address discovery mechanism.

Referring now to the drawings, in which like numerals refer to like components or steps, there are disclosed broad aspects of various exemplary embodiments.

FIG. 1 is a schematic diagram of an exemplary Ethernet network 100 implementing a bridge port MAC address discovery mechanism. Exemplary network 100 includes core network 105, access node 110, bridge ports 112, 114, operator 120, customer premise equipment 130, 135, maintenance endpoints 140, 150, 160, and maintenance intermediate points 145, 155.

In various exemplary embodiments, core network 105 comprises one or more devices that provide a connection from operator 120 to access node 110. Thus, in various exemplary embodiments, core network 105 includes one or more switches, routers, and other similar devices.

In various exemplary embodiments, access node 110 is a device that delivers services to customer premise equipment 130, 135, while managing MIPs 145, 155. Furthermore, in various exemplary embodiments, access node 110 includes two bridge ports 112, 114, which in the illustrated embodiment are logically associated with MIPs 145, 155, respectively. Each port 112, 114 is assigned an internally generated private MAC address unknown to the operator 120. In various exemplary embodiments, access node 110 is an Alcatel-Lucent 7330 Intelligent Services Access Manager Fiber to the Node (ISAM FTTN) Device. It should be apparent, however, that in various exemplary embodiments, access node 110 is any Ethernet device capable of providing one or more services to customers or other entities.

Furthermore, in various exemplary embodiments, operator 120 is a network operator who detects and diagnoses connectivity problems in network 100. Thus, in various exemplary embodiments, operator 120 is a Broadband Remote Access Server (BRAS) or a Border Node Gateway (BNG) operator who desires to test components of network 100 using connectivity fault messages or another type of diagnostic message.

In various exemplary embodiments, network 100 includes customer premise equipment 130, 135. In various exemplary embodiments, customer premise equipment 130, 135 is a personal computer, DSL or other modem, Voice-over IP equipment, firewall, router, switch, server, or any other device suitable for receiving data from access node 110.

Additionally, in various exemplary embodiments, network 100 includes maintenance endpoints 140, 150, and 160. In various exemplary embodiments, MEPs 140, 150, 160 are software entities created within a bridge for the purpose of connectivity fault management or diagnostics. Furthermore, in various exemplary embodiments, MEPs 140, 150, 160 initiate and respond to CFM messages, such as Loopback and Link Trace messages, and/or terminate CMF messages within their domains. It should be apparent that, although primarily described herein with reference to CFM messages, MEPs 140, 150, 160 are capable of initiating and responding to diagnostic messages formulated to comply with a different protocol.

In various exemplary embodiments, maintenance intermediate endpoints 145, 155 are software entities created within a bridge for the purpose of connectivity fault management or diagnostics. Furthermore, in various exemplary embodiments, MIPs 145, 155 passively receive CFM messages and respond to the originating MEP 140, 150, 160 or other initiating device. It should be apparent that, although primarily described herein with reference to CFM messages, MIPs 145, 155 are capable of initiating and responding to diagnostic messages formulated to comply with a different protocol. In addition, it should be apparent that although access node 110 manages MIPs 145, 155, these devices could be replaced by MEPs 140, 150, 160.

Furthermore, it should be apparent that the components of network 100 are illustrated solely as an exemplary embodiment. Thus, in various exemplary embodiments, network 100 includes any combination or arrangement of access nodes, operators, customer premise equipment, maintenance endpoints, maintenance intermediate points, and additional components.

Figures 2, 3, 4, 5:
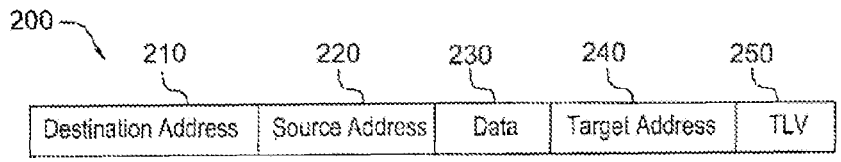
FIG. 2 is a schematic diagram of an exemplary message format used for a diagnostic message.
FIG. 3 is a schematic diagram of an exemplary data arrangement used for a private MAC address.
FIG. 4 is a schematic diagram of an exemplary data arrangement used for a wildcard private MAC address.
FIG. 5 is a schematic diagram of an exemplary data arrangement used for an organization-specific private MAC address.

FIG. 2 is a schematic diagram of an exemplary message format used for a diagnostic message 200. In various exemplary embodiments, diagnostic message 200 includes multiple fields that are included in Loopback, Link Trace, and other diagnostic messages. Thus, in various exemplary embodiments, diagnostic message 200 includes destination address field 210, source address field 220, type-length value 250, target address field 240, and data field 230.

In various exemplary embodiments, destination address field 210 indicates the MAC address of the intended recipient of the message. In various exemplary embodiments, as described further below in connection with FIGS. 4 and 5, a Loopback message is sent with destination address field 210 set to a wildcard private MAC address 400 or to an organization-specific MAC address 500. Accordingly, destination address field 210 may be used to notify the receiving access node 110 that operator 120 is unaware of the entire private MAC address and that access node 110 should forward the message to a plurality of its bridge ports.

In addition, in various exemplary embodiments, source address field 220 indicates the MAC address of the party sending the message. Thus, in various exemplary embodiments, operator 120 places its MAC address in source address field 220 prior to sending the message. Furthermore, when formulating a reply, MEP 140, 150, 160 or MIP 145, 155 adds its private MAC address to source address field 220. Thus, when operator 120 receives the reply message, operator 120 can extract the private MAC address from source address field 220.

In various exemplary embodiments, type-length value (TLV) 250 stores optional data specific to the organization. In various exemplary embodiments, as described further below in connection with FIG. 5, when destination address 210 or target address 240 indicates an organization-specific MAC address 500, TLV 250 stores information used to qualify the request and narrow the number of replies.

Additionally, in various exemplary embodiments, target address field 240 indicates the MAC address of the intended recipient of the message. In various exemplary embodiments, as described further below in connection with FIGS. 4 and 5, a Link Trace message is sent with the target address field 240 set to a wildcard private MAC address 400 or an organization-specific MAC address 500. Accordingly, the target address field 240 may be used to notify receiving access node 110 that operator 120 is unaware of the entire private MAC address and that access node 110 should forward the message to all of its bridge ports.

Finally, in various exemplary embodiments, diagnostic message 200 includes data field 230, which is used to store various data values associated with the request. Thus, in various exemplary embodiments, data field 230 holds at least one of an operation code, protocol version number, sequence number, and time-to-live (TTL).

FIG. 3 is a schematic diagram of an exemplary data arrangement used for a private unicast MAC address 300. In various exemplary embodiments, private MAC address 300 is similar in structure and functionality to a typical MAC address. Thus, in various exemplary embodiments, private MAC address 300 uniquely identifies a particular MEP or MIP in access node 110. Furthermore, in various exemplary embodiments, private MAC address 300 uses a six-byte or forty-eight bit configuration, with each range of bits storing a specified field.

As illustrated in exemplary private MAC address 300, bits 47-45 store the Rack ID, which, in various exemplary embodiments, uniquely identifies a particular rack in access node 110. Bits 44 and 42 of private MAC address 300 are not used for MAC address discovery. Bit 43 of private MAC address 300 stores a bit used to indicate that CFM will be utilized.

In addition, in various exemplary embodiments, bit 41 indicates whether the address is globally unique (value set to "0") or locally administered (value set to "1"). Thus, in various exemplary embodiments, the value of this bit is set to "1" to indicate that private MAC address 300 is locally administered. Furthermore, in various exemplary embodiments, bit 40 is set to "0" to indicate that private MAC address 300 is associated with an individual address (i.e. unicast).

Bits 39-21 of exemplary private MAC address 300 store the Digital Subscriber Line Access Multiplexer (DSLAM) ID. Thus, in various exemplary embodiments, these bits uniquely identify access node 110. Bits 20-15 of exemplary private MAC address 300 store the Slot ID, which, in various exemplary embodiments, uniquely identifies a particular slot within a rack of access node 110.

Additionally, in various exemplary embodiments, bits 14-6 store a Port ID, which, in various exemplary embodiments, is an internally generated value that uniquely identifies the particular physical port. Thus, in various exemplary embodiments, access node 110 assigns each MEP and MIP a unique identifier corresponding to the physical port number. Finally, in various exemplary embodiments, bits 5-0, which store a MAC ID, are used to indicate the type of the MAC address, as described in further detail below.

In various exemplary embodiments, the combination of the Rack ID, DSLAM node ID, Slot ID, and Port ID indicate which bridge port in access node 110 is identified by private MAC address 300. Accordingly, bits 47-45 and 39-6 are used in combination to indicate the addressed bridge port. Thus, in various exemplary embodiments, because the Port ID is internally generated by access node 110, private MAC address 300 cannot be determined without querying access node 110.

It should be apparent that the data structure described above with respect to private MAC address 300 is exemplary. Thus, in various exemplary embodiments, the fields of private MAC address 300 are assigned a different number of bits and/or are arranged in a different order. Furthermore, in various exemplary embodiments, private MAC address 300 omits one or more of the fields illustrated in FIG. 3 and/or includes additional fields. In addition, in various exemplary embodiments, private MAC address 300 includes a different number of bits, such as sixty-four bits.

FIG. 4 is a schematic diagram of an exemplary data arrangement used for a wildcard private MAC address 400. In various exemplary embodiments, wildcard private MAC address 400 is used in the destination address field 210 of a Loopback message or the target address field 240 of a Link Trace message. More specifically, an operator uses wildcard private MAC address 400 when an operator 120 is unaware of one or more fields in the private MAC address of the destination or target.

Accordingly, as illustrated in exemplary wildcard private MAC address 400, operator 120 sets the last two bits in the destination address field to "01," thereby indicating that the Port ID field of the MAC address is unknown and should be treated as a wildcard. When composing wildcard private MAC address 400, operator 120 may include at least one of the Rack ID, DSLAM node ID, and Slot ID to further narrow the query. Accordingly, when an operator 120 is unaware of one or more fields in the private MAC address of the destination, the operator 120 may use wildcard private MAC address 400 in the Loopback, Link Trace, or other diagnostic message to discover the entire private MAC address, as described further below in connection with FIG. 6.

It should be apparent that although wildcard private MAC address 400 uses the bit combination "01" to flag the Port ID as a wildcard field, various exemplary embodiments utilize a different combination or number of bits, such as "00", "11", or "110". In addition, in various exemplary embodiments, the flag is placed in a different location of the MAC address, such as, for example, bits 4 and 5 of the MAC address. Furthermore, in various exemplary embodiments, any of the fields of the MAC address is used as a wildcard, including the Rack ID, DSLAM node ID, and Slot ID. Moreover, in various exemplary embodiments, two or more fields of the destination MAC address are unknown and are therefore all specified as wildcard fields.

FIG. 5 is a schematic diagram of an exemplary data arrangement used for an organization-specific private MAC address 500. In various exemplary embodiments, organization-specific private MAC address 500 is used in the destination address field 210 of a Loopback Message or the target address field 240 of a Link Trace message when an operator is unaware of one or more fields in the private MAC address of the destination or target.

Accordingly, as illustrated in exemplary organization-specific private MAC address 500, operator 120 sets the last six bits in the MAC address 500 to "111111," thereby indicating that the organization-specific TLV 250 transferred with the LBM or LTM contains a request that needs to be handled. More specifically, in various exemplary embodiments, the operator 120 composes the organization-specific TLV 250 to include at least one of the Rack ID, DSLAM node ID, Slot ID, and physical port number. Furthermore, in various exemplary embodiments, operator 120 also includes other information such as the Virtual Channel Identifier (VCI) and the Virtual Path Identifier (VPI), which further restricts the request and reduces the amount of replies. Accordingly, when an operator 120 is unaware of one or more fields in the private MAC address of the destination, operator 120 can use organization-specific private MAC address 500 in the Loopback, Link Trace, or other diagnostic message to discover the entire private MAC address, as described further below in connection with FIG. 6.

It should be apparent that although organization-specific private MAC address 500 uses the bit combination "111111" to indicate that the organization-specific TLV 250 contains a request that needs to be handled, various exemplary embodiments utilize a different combination or number of bits, such as "111", "000", or "101010". In addition, in various exemplary embodiments, the flag is placed in a different location of the MAC address, such as, for example, bits 4 and 5 of the MAC address.

Figure 6:
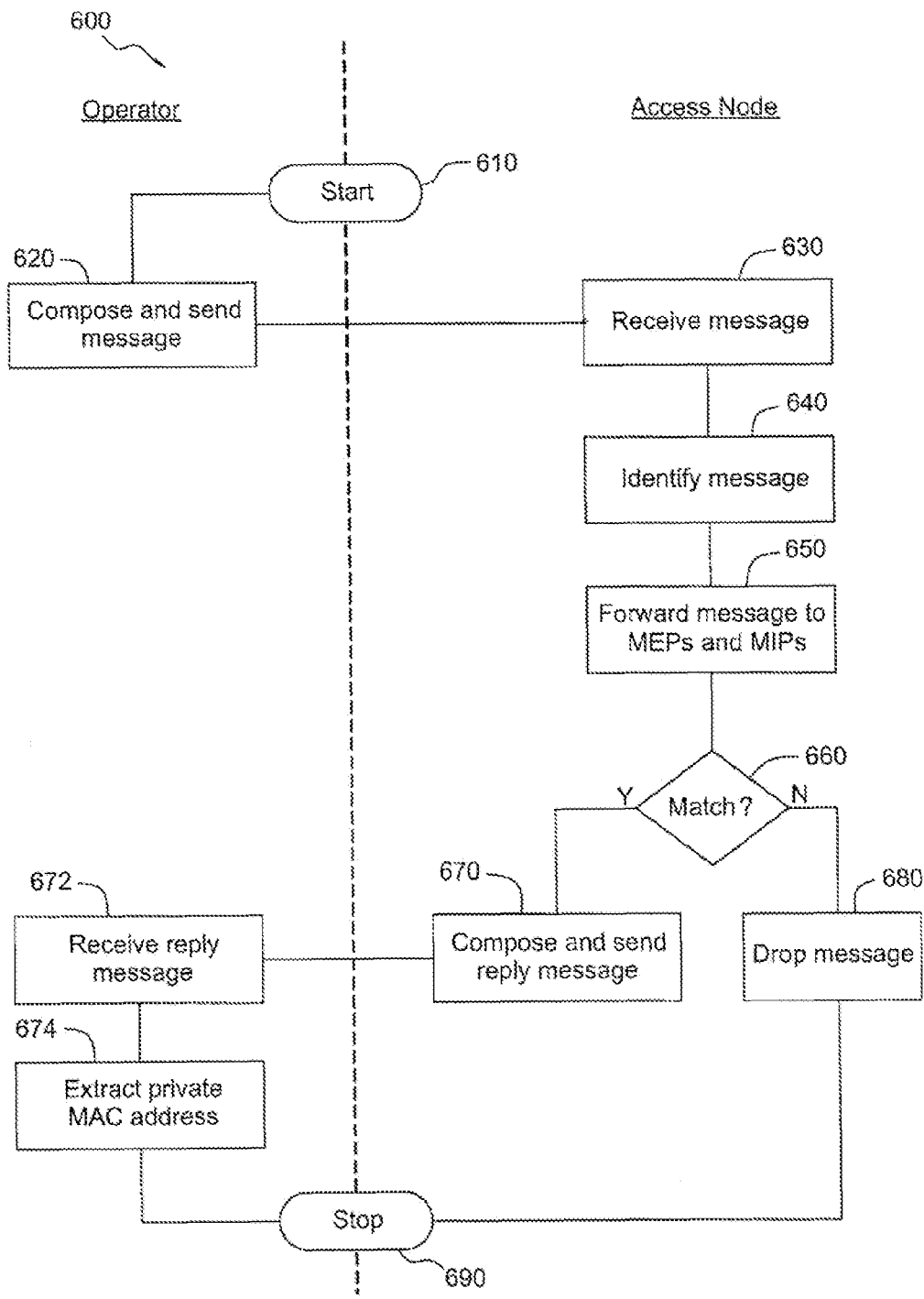
FIG. 6 is a flow chart of an exemplary embodiment of a method for implementing a bridge port MAC address discovery mechanism.

FIG. 6 is a flow chart of an exemplary embodiment of a method 600 for implementing a bridge port MAC address discovery mechanism. It should be apparent that method 600 may be used to discover either a public or private MAC address. Furthermore, as indicated by the dashed vertical line, exemplary method 600 involves the interaction of two entities, operator 120 and access node 110.

Exemplary method 600 starts in step 610 and proceeds to step 620, where a BRAS or other network operator 120 composes and sends a message. In various exemplary embodiments, operator 120 composes a CFM message, such as a Loopback message or a Link Trace message, or some other diagnostic message. Furthermore, in various exemplary embodiments, operator 120 utilizes either a wildcard private MAC address 400, described above in connection with FIG. 4, or an organization-specific private MAC address 500, described above in connection with FIG. 5. Thus, in various exemplary embodiments, the LBM or LTM is an Ethernet CFM message including at least one of a destination MAC address, a target MAC address, a source MAC address, and one or more fields for type-length values.

After composing the message, operator 120 sends the message for processing. In various exemplary embodiments, the message is initiated from MEP 160, targeting MIPs 145, 155 on access node 110. In various exemplary embodiments, the LBM or LTM message is sent multicast, such that a number of nodes in network 100 receive the message. Because the destination address is unknown, the LBM or LTM with a wildcard destination address is flooded throughout network 100. Final destination nodes without the capability of handling the wildcard destination address drop the message upon receipt.

After composing and sending the message in step 620, exemplary method 600 proceeds to step 630, where an access node 110 receives the CFM or diagnostic message. Exemplary method 600 then proceeds to step 640, where access node 110 identifies the message as an LBM, LTM, or some other diagnostic message. Furthermore, in various exemplary embodiments, access node 110 determines whether the destination address of the message is set to a wildcard private MAC address 400 or an organization-specific private MAC address 500.

When, in step 640, access node 110 identifies the message as including either a wildcard private MAC address 400 or an organization-specific private MAC address 500, exemplary method 600 proceeds to step 650, where access node 110 forwards the message for processing to all MEPs and MIPs on its bridge ports 112, 114. Exemplary method then proceeds to step 660.

In step 660, when an MEP or MIP receives the message, the MEP or MIP processes the message. More particularly, in various exemplary embodiments, the MEP or MIP determines whether its physical location matches the physical bridge port information embedded in the wildcard private MAC address 400 or in the organization-specific TLV 250.

When in step 660, the MEP or MIP determines that its physical location matches the physical bridge port information embedded in the request, method 600 proceeds to step 670, where the MEP or MIP composes a Loopback Reply, Link Trace Reply, or some other reply message. More particularly, in various exemplary embodiments, the MEP or MIP places its MAC address in the source address field 220 of the reply message and places the address of operator 120 in the destination address field 210 of the reply message. The MEP or MIP then sends the reply message back to the operator 120.

After sending the reply message in step 670, exemplary method 600 proceeds to step 672, where operator 120 receives the reply message from the MEP or MIP. Exemplary method 600 then proceeds to step 674 where, in various exemplary embodiments, operator 120 extracts the value stored in the source address of the reply to determine the MAC address of the MEP or MIP.

It should be apparent that, in various exemplary embodiments, more than one bridge port resides on the same physical port. Thus, in various exemplary embodiments, multiple MEPs or MIPs identify a match in step 660 and send a reply message in step 670. Accordingly, in various exemplary embodiments, in step 672, operator 120 receives multiple reply messages in response to the original LBM, LTM, or other request. Following step 674, exemplary method 600 proceeds to step 690, where exemplary method 600 stops.

When, in step 660, the MEP or MIP determines that its physical location does not match the physical bridge port information embedded in the request, exemplary method 600 proceeds to step 680, where the MEP or MIP drops the message and does not send a reply. Exemplary method 600 then proceeds to step 690, where exemplary method 600 stops.

Referring now to FIGS. 1-6, three specific examples will be provided. In the examples that follow, it will be assumed that access node 110 has an access node ID equal to "123." Furthermore, it will be assumed that bridge port 112, which is associated with MIP 145, has a Rack ID of "1," a Slot ID of "1/1/5," and a physical port number of "1." Finally, it will be assumed that bridge port 114, which is associated with MIP 155, has a Rack ID of "1," a Slot ID of "1/1/4," and a physical port number of "1."

It should be apparent that, although the following examples are described with reference to MIPs, in various exemplary embodiments, bridge ports 112, 114 are instead associated with MEPs. In these embodiments, the MEP behavior is similar to the MIP behavior described in detail in the following examples.

In a first specific example, an operator desires to query the MIP located at bridge port 1/1/4/1 to determine its private MAC address. The method begins in step 610 and proceeds to step 620, where operator 120 composes a Loopback message using a wildcard private MAC address 400. More particularly, operator 120 sets the last two bits of wildcard private MAC address 400 to "01" to indicate that the address is a Port ID wildcard, and fills in the corresponding fields for Rack ID, DSLAM node ID, Slot ID, and the physical Port ID in wildcard private MAC address 400.

Operator 120 then composes the LBM by filling in the appropriate fields in message 200. More particularly, the operator fills destination address field 210 with wildcard private MAC address 400 and source address field 220 with the MAC address of operator 120. Operator 120 then sends the message from MEP 160, which travels through the network flooding all L2 switches along the way, as the destination address is unknown.

Access node 110 receives the LBM in step 630, identifies the message in step 640, and floods the message internally to the bridge ports 112, 114 in step 650. In step 660, each of the MIPs 145, 155 located at bridge ports 112, 114 process the message to determine whether the physical bridge port information contained in wildcard private MAC address 400 matches the physical location of the port.

Because MIP 145 is located at bridge port 1/1/5/1, its physical location does not match the physical bridge port information contained in the LBM. Therefore, MIP 145 does not send a reply message and instead drops the message in step 680 and proceeds to step 690, where method 600 stops.

On the other hand, because MIP 155 is located at bridge port 1/1/4/1, its physical location matches the physical bridge port information contained in the LBM. Therefore, in step 670, MIP 155 composes and sends a reply message using the format specified in message 200, with destination address field 210 set to the MAC address of operator 120 and source address field 220 set to the private MAC address of bridge port 114.

Upon receiving the reply from MIP 155, in step 672, operator 120 proceeds to step 674, where operator 120 determines the private MAC address of bridge port 114 by extracting the value stored in source address field 220 of the reply message. Method 600 then proceeds to step 690, where method 600 stops.

In a second specific example, an operator desires to obtain the private MAC address of the MIP located at bridge port 1/1/4/1 using a Link Trace message. The method begins in step 610 and proceeds to step 620, where operator 120 composes an LTM using a wildcard private MAC address 400. More particularly, operator 120 sets the last two bits of the MAC ID field to "01" to indicate that the address is a Port ID wildcard, and fills in the corresponding fields for Rack ID, DSLAM node ID, Slot ID, and the physical Port ID in wildcard private MAC address 400.

Operator 120 then composes the LTM by filling in the appropriate fields in message 200. More particularly, the operator fills destination address field 210 with a multicast destination address, fills source address field 220 with the MAC address of operator 120, and fills target address field 240 with wildcard private MAC address 400. Operator 120 then sends the message from MEP 160, which travels through the network based on its multicast destination address.

Access node 110 receives the LTM in step 630, identifies the message in step 640, and floods the message internally to the bridge ports 112, 114 in step 650. In step 660, each of the MIPs 145, 155 located at bridge ports 112, 114 process the message to determine whether the physical bridge port information contained in wildcard private MAC address 400 matches the physical location of the port.

Because MIP 145 is located at bridge port 1/1/5/1, its physical location does not match the physical bridge port information contained in the message. Therefore, MIP 145 does not send a Link Trace reply message and instead drops the message in step 680 and proceeds to step 690, where method 600 stops.

On the other hand, because MIP 155 is located at bridge port 1/1/4/1, its physical location matches the physical bridge port information contained in the target address 240 of the LTM. Therefore, in step 670, MIP 155 composes and sends a reply message using the format specified in message 200, with destination address field 210 set to the MAC address of operator 120 and source address field 220 set to the private MAC address of bridge port 114.

Upon receiving the reply from MIP 155 in step 672, operator 120 proceeds to step 674, where operator 120 determines the private MAC address of bridge port 114 by extracting the value stored in source address field 220 of the reply message. Method 600 then proceeds to step 690, where method 600 stops.

In a third specific example, an operator again desires to obtain the private MAC address of the MIP located at bridge port 1/1/4/1 using a Link Trace message. In this example, however, the operator decides to specify physical bridge port information using an organization-specific type length value, rather than using the destination address field.

The method begins in step 610 and proceeds to step 620, where operator 120 composes an LTM using an organization-specific private MAC address 500. More particularly, operator 120 sets the last six bits of MAC address 500 to "111111" to indicate that additional information will be placed in type-length value 250.

Operator 120 then composes the LTM by filling in the appropriate fields in message 200. More particularly, the operator fills destination address field 210 with a multicast destination address, fills source address field 220 with the MAC address of operator 120, and fills target address field 240 with organization-specific private MAC address 500. In addition, operator places the Rack ID, DSLAM node ID, Slot ID, and physical port number in organization-specific TLV 250. Operator then sends the message from MEP 160, which travels through the network 100 based on its multicast destination address.

Access node 110 receives the LTM in step 630, identifies the message in step 640, and floods the message internally to the bridge ports 112, 114 in step 650. In step 660, each of the MIPs 145, 155 located at bridge ports 112, 114 process the message to determine whether the physical bridge port information contained in organization-specific TLV 250 matches the physical location of the port.

Because MIP 145 is located at bridge port 1/1/5/1, its physical location does not match the physical bridge port information contained in the message. Therefore, MIP 145 does not send a Link Trace reply message and instead drops the message in step 680 and proceeds to step 690, where method 600 stops.

On the other hand, because MIP 155 is located at bridge port 1/1/4/1, its physical location matches the physical bridge port information contained in the LTM. Therefore, in step 670, MIP 155 composes and sends a reply message using the format specified in message 200, with destination address field 210 set to the MAC address of operator 120 and source address field 220 set to the private MAC address of bridge port 114.

Upon receiving the reply from MIP 155 in step 672, operator 120 proceeds to step 674, where operator 120 determines the private MAC address of bridge port 114 by extracting the value stored in source address field 220 of the reply message. Method 600 then proceeds to step 690, where method 600 stops.

According to the forgoing, various exemplary embodiments provide an efficient bridge port MAC address discovery mechanism for use in Ethernet networks. Furthermore, various exemplary embodiments discover MAC addresses while minimizing network traffic and avoiding intervention of the service provider. More particularly, various exemplary embodiments allow an operator to discover the MAC address of an MEP or MIP by providing only physical port information.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A method of discovering medium access control (MAC) addresses in a network, the method comprising:
   receiving, at an access node, a diagnostic message from an operator, the diagnostic message comprising physical port information and indicating that at least a portion of a MAC address of a destination bridge port is unknown to the operator;
   forwarding the diagnostic message to a respective bridge port of the access node;
   determining whether the physical port information specified in the diagnostic message corresponds to a physical port of the respective bridge port; and
   sending a reply message to the operator specifying a MAC address of the respective bridge port, wherein the diagnostic message comprises a destination MAC address for a Loopback message and a target MAC address for a Link Trace message, wherein a wildcard private MAC address is used in the destination MAC address for the Loopback message and in the target MAC address for the Link Trace message, and wherein at least two bits of the wildcard private MAC address are set to a predetermined pattern, the predetermined pattern identifying the portion of the MAC address unknown to the operator.

2. The method of claim 1, wherein the predetermined pattern identifies a port ID as unknown to the operator.

3. The method of claim 1, wherein the diagnostic message is an Ethernet Connectivity Fault Management Loopback message.

4. The method of claim 1, wherein the diagnostic message is an Ethernet Connectivity Fault Management Link Trace message.

5. A method of discovering medium access control (MAC) addresses in a network, the method comprising:
    receiving, at an access node, a diagnostic message from an operator, the diagnostic message comprising physical port information and indicating that at least a portion of a MAC address of a destination bridge port is unknown to the operator, wherein at least two bits of a specified MAC address are set to a predetermined pattern, the predetermined pattern indicating that a request is stored in a type-length value field of the diagnostic message and wherein at least two bits of a wildcard private MAC address are set to a predetermined pattern, the predetermined pattern identifying the portion of the MAC address unknown to the operator;
    forwarding the diagnostic message to a respective bridge port of the access node;
    determining whether the physical port information specified in the diagnostic message corresponds to a physical port of the respective bridge port; and
    sending a reply message to the operator with the specified MAC address of the respective bridge port.

6. The method of claim 5, wherein the type-length value field of the diagnostic message identifies at least one of a rack ID, node ID, slot ID, and port ID of the destination bridge port.

7. The method of claim 5, wherein the diagnostic message is an Ethernet Connectivity Fault Management Loopback message.

8. The method of claim 5, wherein the diagnostic message is an Ethernet Connectivity Fault Management Link Trace message.

9. The method of claim 5, wherein the step of determining whether the physical port information specified in the diagnostic message corresponds to a physical port of the bridge port is performed by at least one of a Maintenance Endpoint and a Maintenance Intermediate Point.

10. The method of claim 5, wherein the reply message comprises a source address field, the source address field set to the MAC address of the respective bridge port.

11. The method of discovering MAC addresses in a network according to claim 5, further comprising:
    extracting the MAC address from the reply message.

12. An access node in a network, the access node comprising:
    a bridge port; and
    a processor, wherein the processor receives a diagnostic message sent by an operator, the diagnostic message comprising physical port information and indicating that at least a portion of a MAC address of the bridge port is unknown to the operator,
    the processor forwards the diagnostic message to the bridge port,
    the bridge port determines whether the physical port information specified in the diagnostic message corresponds to a physical port of the bridge port, and
    the bridge port sends a reply message to the operator specifying the MAC address of the bridge port, wherein the diagnostic message comprises a destination MAC address, for a Loopback message, and a target MAC address, for a Link Trace message, wherein a wildcard private MAC address is used in the destination MAC address for the Loopback message and in the target MAC address for the Link Trace message, wherein at least two bits of the wildcard private MAC address are set to a predetermined pattern, the predetermined pattern identifying the portion of the MAC address unknown to the operator.

13. An access node in a network, the access node comprising:
    a bridge port; and
    a processor, wherein the processor receives a diagnostic message sent by an operator, the diagnostic message comprising physical port information and indicating that at least a portion of a MAC address of the bridge port is unknown to the operator, wherein at least, two bits of a wildcard private MAC address are set to a predetermined pattern, the predetermined pattern identifying the portion of the MAC address unknown to the operator and at least two bits of a specified MAC address are set to a predetermined pattern, the predetermined pattern indicating that a request is stored in a type-length value field of the diagnostic message
    the processor forwards the diagnostic message to the bridge port,
    the bridge port determines whether the physical port information specified in the diagnostic message corresponds to a physical port of the bridge port, and
    the bridge port sends a reply message to the operator with the specified MAC address of the bridge port.

14. A method of discovering MAC addresses in a network, the method comprising:
    composing a diagnostic message at an operator, the diagnostic message comprising physical port information and indicating that at least a portion of a MAC address of a destination bridge port is unknown to the operator, wherein the operator is a server;
    sending the diagnostic message to an access node;
    receiving a reply message from the access node when the physical port information specified in the diagnostic message corresponds to a physical port of a respective bridge port in the access node, the reply message indicating the MAC address of the respective bridge port, wherein the diagnostic message comprises a destination MAC address for a Loopback message and a target MAC address for a Link Trace message, wherein a wildcard private MAC address is used in the destination MAC address for the Loopback message and in the target MAC address for the Link Trace message, wherein at least two bits of the wildcard private MAC address are set to a predetermined pattern, the predetermined pattern identifying the portion of the MAC address unknown to the operator.

15. The method of discovering MAC addresses in a network according to claim 14, the method further comprising:
    extracting the MAC address from the reply message.

16. The method of discovering MAC addresses in a network according to claim 14, wherein the diagnostic message is selected from the group consisting of an Ethernet Connectivity Fault Management Loopback message and an Ethernet Connectivity Fault Management Link Trace message.

17. A method of discovering MAC addresses in a network, the method comprising:
    composing a diagnostic message at an operator, the diagnostic message comprising physical port information and indicating that at least a portion of a MAC address of a destination bridge port is unknown to the operator, wherein the diagnostic message comprises a specified MAC address selected from the group consisting of a destination MAC address for a Loopback message and a target MAC address for a Link Trace message, wherein a wildcard private MAC address is used in the destination MAC address for the Loopback message and in the target MAC address for the Link Trace message, a predetermined pattern indicates that a request is stored in a type-length value (TLV) field of the diagnostic message, and wherein at least two bits of the wildcard private MAC address are set to a predetermined pattern, the predetermined pattern identifying the portion of the MAC address unknown to the operator, wherein the operator is a server:

sending the diagnostic message to an access node;

receiving a reply message from the access node when the physical port information specified in the diagnostic message corresponds to a physical port of a respective bridge port in the access node. the reply message indicating the MAC address of the respective bridge port.

* * * * *